United States Patent

Camras

[15] 3,686,467

[45] Aug. 22, 1972

[54] MAGNETIC TRANSDUCER SYSTEM AND METHOD

[72] Inventor: Marvin Camras, Glencoe, Ill.

[73] Assignee: IIT Research Institute, Chicago, Ill.

[22] Filed: Aug. 8, 1969

[21] Appl. No.: 848,559

[52] U.S. Cl...................179/100.2 C, 179/100.2 CH, 340/174.1 F

[51] Int. Cl...................G11b 5/00

[58] Field of Search..............179/100.2 C, 100.2 CH; 340/174.1

[56] References Cited

UNITED STATES PATENTS

| | | | |
|---|---|---|---|
| 2,975,241 | 3/1961 | Camras | 179/100.2 C |
| 3,467,789 | 9/1969 | Johnson | 179/100.2 C |
| 3,485,962 | 12/1969 | Barns | 179/100.2 C |
| 3,518,646 | 6/1970 | Sakasegawa | 179/100.2 C |
| 3,519,763 | 7/1970 | Lode | 179/100.2 C |
| 2,961,645 | 11/1960 | Dickinson | 179/100.2 |
| 3,391,254 | 7/1968 | Honig | 179/100.2 |

OTHER PUBLICATIONS

British Patent No. 930,545, published 7-3-1963, 3 pp. Spec. 1 sht. drawings.

*Primary Examiner*—Terrell W. Fears

*Attorney*—Hill, Sherman, Meroni, Gross & Simpson

[57] ABSTRACT

A magnetic transducer head having a coupling gap of controllable effective longitudinal dimension. In one embodiment a gap spacer of magnetic material is energized by bias current and/or signal current during recording while being deenergized during playback to provide a larger coupling gap for recording than for playback. Recording gap size may be controlled dynamically, or a very high frequency bias current such as 100 mhz may be supplied to the magnetic gap spacer. A magnetic head may have a zero gap dimension when the magnetic gap spacer is deenergized to prevent any substantial residual external field. An electro-magnetic transducer head with the electric circuit portion including a path through the electrically conductive magnetic corepiece at the transducer gap, thus concentrating the gap field and mininizing core losses at very high bias or signal frequencies.

1 Claim, 11 Drawing Figures

Patented Aug. 22, 1972 3,686,467
2 Sheets-Sheet 1
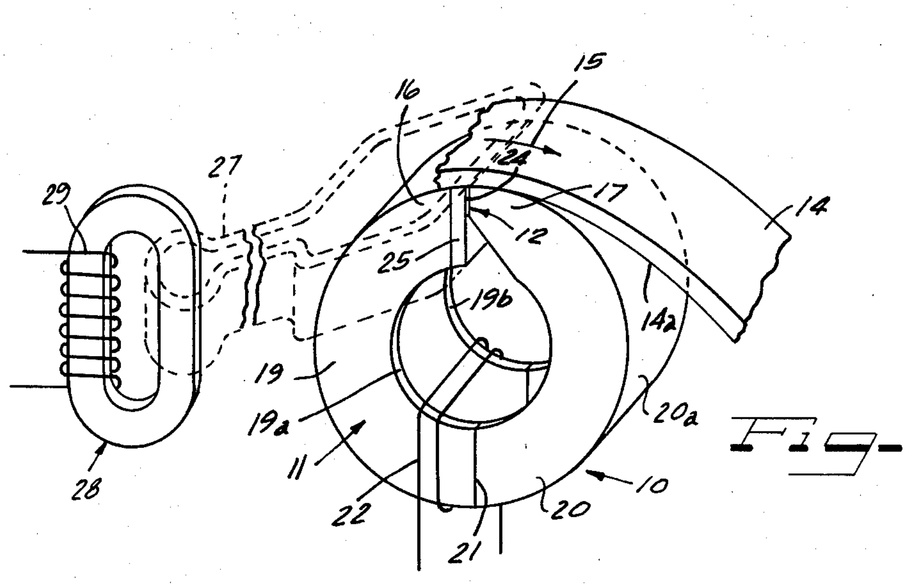
FIG. 1
FIG. 3
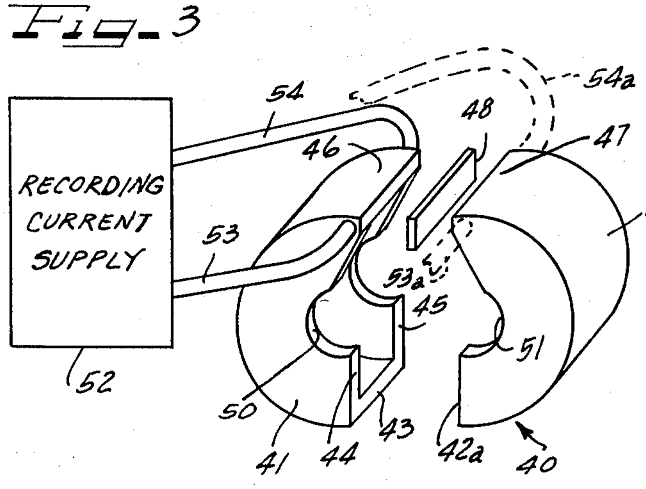
FIG. 2
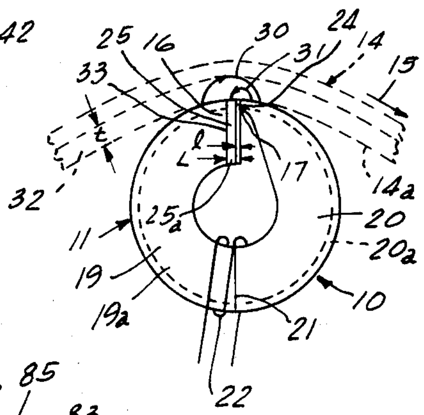
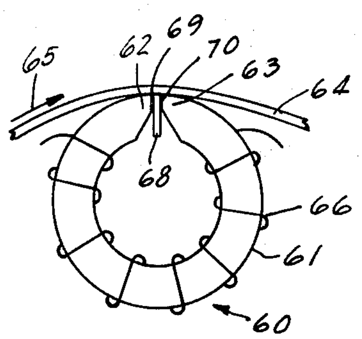
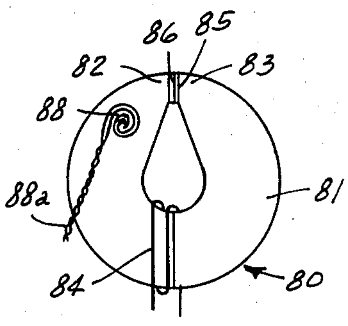
FIG. 4
FIG. 5
INVENTOR.
MARVIN CAMRAS
BY Hill, Sherman, Meroni, Gross & Simpson ATTORNEYS

INVENTOR.

MARVIN CAMRAS

BY Hill, Sherman, Meroni, Gross & Simpson ATTORNEYS

MAGNETIC TRANSDUCER SYSTEM AND METHOD

CROSS REFERENCES TO RELATED APPLICATIONS

Reference is made in compliance with the requirement of 35 U.S.C. 120 to my copending application Ser. No. 536,869 filed Mar. 23, 1966 (now U.S. Pat. No. 3,591,729 issued July 6, 1971) and to my copending application Ser. No. 628,682 filed Apr. 5, 1967 (now U.S. Pat. No. 3,534,177 issued Oct. 13, 1970). As stated at application pages 20 and 21 hereof, the disclosures of these applications are incorporated herein by reference.

SUMMARY OF THE INVENTION

This invention relates to a magnetic transducer head suitable for recording, playback, and/or erasing operation with respect to a magnetic record medium.

It is an object of the present invention to provide a novel magnetic transducer head.

Another object of the invention is to provide a magnetic transducer head of improved efficiency for recording playback and/or erasing operation.

A further object of the present invention is to provide a recording and/or erasing head also capable of high resolution playback operation.

A still further object of the invention resides in the provision of a novel cross field head construction for recording on magnetic record media.

A feature of the invention resides in the provision of a transducer head having a coupling gap region of controllable effective dimension.

A further feature resides in a magnetic head with a coupling region which may be rendered magnetic to prevent any substantial residual external field.

A further feature resides in a recording head having an increased recording field gradient at a trailing pole thereof with respect to direction of travel of a magnetic record medium thereacross.

Still another feature resides in the provision of a magnetic transducer head providing for dynamic variation in effective gap dimension during a transducing operation.

Another and further feature resides in the provision of a transducer head in which the electric path includes a magnetic corepiece that defines the gap.

Yet another feature relates to an electro-magnetic transducer head with the electric circuit portion including a path through the electrically conductive magnetic corepiece at the transducer gap, thus concentrating the gap field and minimizing core losses at very high bias or signal frequencies.

Another feature of the invention resides in the provision of a recording head accommodating very high bias frequencies, for example 100 megahertz with negligible core losses.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure.

BRIEF DESCRIPTION OF THE DRAWINGS

FIG. 1 is a somewhat diagrammatic perspective view illustrating a first embodiment in accordance with the present invention;

FIG. 2 is a somewhat diagrammatic side view illustrating certain concepts of the present invention;

FIG. 3 is a somewhat diagrammatic perspective view illustrating a further embodiment in accordance with the present invention;

FIG. 4 illustrates a further embodiment of magnetic transducer head;

FIG. 5 shows another embodiment of magnetic transducer head;

DESCRIPTION OF THE PREFERRED EMBODIMENTS

Figure 6:
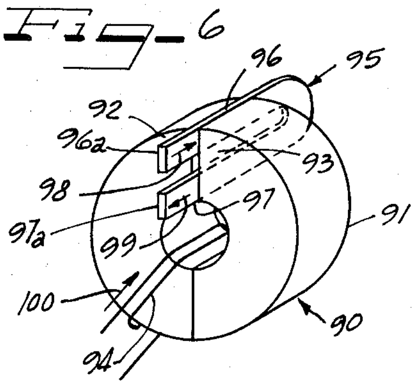
FIG. 6 illustrates a further embodiment with vertically offset current flow paths in the gap region.

Referring to FIG. 1 there is illustrated a magnetic transducer head 10 comprising a magnetic core 11 having a coupling region generally indicated at 12 for coupling of the magnetic core with a magnetic record medium 14 traveling in the direction indicated by arrow 15. By way of example, the magnetic core 11 may include a pair of magnetic poles 16 and 17 which receive the active surface 14*a* of the magnetizable layer of the record medium 14 in sliding relation. Further by way of example, core 11 may be formed of two magnetic core parts 19 and 20 which are in abutting relation along a junction line 21. Each of the core parts 19 and 20 may be of channel cross section and include side flange parts such as indicated at 19*a* and 19*b* which are integrally joined with a main core portion of core part 19 corresponding to the main core portion 20*a* of the core part 20. A transducer winding 22 is shown linking the core 10 with a desired number of turns.

In the illustrated embodiment, the coupling region 12 is formed by a non-magnetic gap spacer 24 and a gap spacer 25 of magnetic material. The gap spacer 25 is shown as being connected at its opposite ends with a secondary winding 27 which may thus supply an energizing current which flows through the magnetic gap spacer 25 from one side of the magnetic core 11 to the opposite side. The secondary winding 27 is coupled with a transformer 28 having a primary winding 29 which may, for example, form the tank coil of an oscillator circuit for producing a high frequency bias current in the low impedance secondary winding 27. Alternatively, transformer 28 may be of a ferrite cup core configuration for supplying both the signal and high frequency bias signal to the secondary winding 27, or for supplying the signal current to be recorded only. The secondary circuit 27 has been shown in dash outline for the sake of clarity, and it will be understood that the secondary circuit may be formed of a copper strap having its opposite ends connected with the opposite ends of the magnetic gap spacer material 25. By way of example, the non-magnetic gap spacer 24 may be of a conductive material such as beryllium copper, silver or the like, or the gap spacer 24 may be formed as a thin film of insulating material such as silicon monoxide. Where the non-magnetic gap spacer 24 is of electrically conductive material, a very thin electrical insulating layer may be provided between the gap spacers 24 and 25. Also, the magnetic gap spacer 25 may have a very thin electrically insulating layer separating it from any other conductive material for example of the core 11 so that the electric exciting current produced by the secondary winding 27 flows exclusively through the magnetic gap spacer 25.

During recording operation for the embodiment of FIG. 1, high frequency bias current may be supplied to the primary winding 29 so as to produce a high frequency bias current in the magnetic gap spacer 25 along a current flow path extending from one side of the magnetic core 11 to the other. Signal current varying in accordance with a signal to be recorded could then be supplied to the transducer winding 22. The excitation of the magnetic gap spacer 25 by the high frequency bias current would produce a magnetic field within the magnetic material of the spacer 25 tending to saturate such material and thus to substantially reduce its permeability with respect to the signal flux introduced at the winding 22. Thus, during recording, the magnetic gap spacer 25 is energized by an electric current rendering it "non-magnetic" during time intervals so as to provide an effective coupling region having a longitudinal extent which is substantially greater than the thickness dimension of the non-magnetic gap spacer 24. By way of example, the effective extent of the coupling region for recording could correspond to the thickness dimension of the magnetizable layer of the record medium 14 for efficient recording operation.

FIG. 2 may be taken as illustrating the operation of the embodiment of FIG. 1 when a first recording signal such as a high frequency bias current is supplied to the magnetic gap spacer 25 to produce a first magnetic field such as indicated at 30, and a second recording current such as a video signal current in accordance with a signal to be recorded is supplied to the transducer winding 22 to produce a second magnetic recording field as indicated at 31. As illustrated in FIG. 2, the recording current supplied to the magnetic gap spacer 25 may produce what may be termed a cross field component 30 which is substantially different in configuration from the field which may be produced by energization of the transducer winding 22 which may be termed the main field component 31. Considering the magnetic circuit associated with the magnetic field produced by the current in the magnetic gap spacer 25, it is found that with the magnetic core 11 present adjacent the magnetic gap spacer 25, the impedance presented with respect to current flowing at the lower part of the gap spacer such as indicated at 25a is substantially higher than the impedance presented to current flow through the magnetic gap spacer 25 adjacent the record medium path, so that the current density through the cross section of the magnetic gap spacer 25 progressively increases from the lower portion as indicated at 25a to the upper portion adjacent the magnetic record medium path. The result is that the cross field 30 exhibits a configuration similar to that which would be produced if both gap spacers 24 and 25 were non-magnetic and a current were applied directly through the spacer 25. On the other hand, the main field 31 approaches the configuration which would be produced if the gap spacer 25 were simply integral with the core part 19. Whether the head is operated in x-field mode or not, preferably the thickness of the gap spacer 25 in the direction of travel of the record medium is substantially equal to the thickness of the layer 32 of magnetizable material of the record medium 14.

Referring to FIG. 2, an insulating layer may be deposited on the pole face of pole 16 as indicated at 33 in FIG. 2.

Of course, signal current and superimposed high frequency bias current may be supplied to the magnetic gap spacer 25 so that the signal cross field component of the field 30 would modify the main signal field 31 so as to produce a resultant magnetic signal field at the trailing pole 17 having a more rapidly decreasing longitudinal field intensity in the direction of tape motion than would the main signal field component 31 alone.

Energizing the magnetic gap spacer 25 with a very high frequency bias current for example of the order of 100 megahertz or higher, the tendency toward increased current density at the portion of the gap spacer closest to the magnetic record medium path is increased, further concentrating the current and magnetic field adjacent the tape magnetizable layer 32. The magnetic flux path for the high frequency bias current adjacent the magnetizable layer 32 is completed through the magnetic gap spacer 25, so that completion is not required through the relatively inefficient main core 11 which may present relatively high eddy current and hysteresis losses at the high bias frequency.

The electrically insulating layer 33 may be very thin in comparison even to the thickness of the non-magnetic gap spacer 24 and may be provided by a film of a metal oxide, an evaporated silicon monoxide deposited on the pole face of pole 16, a magnesium fluoride film, or the like.

FIG. 3 illustrates a magnetic transducer head 40 including a pair of core parts 41 and 42 of channel cross section as in the embodiment of FIG. 1. Thus the core part 41 may include a main core portion 43 and side flange portions 44 and 45. The back edge faces such as indicated at 42a of the cores 41 and 42 may be in abutting engagement to define a junction line such as indicated at 21 in FIG. 1. The pole portions 46 and 47 of core parts 41 and 42 may be in close confronting relation separated by a non-magnetic gap spacer 48, the gap spacer 48 having a thickness dimension small in comparison with the thickness of the tape layer such as indicated at 32 in FIG. 2, and for example being of a thickness suitable for the playback of a longitudinally recorded video signal. While for clarity, the head 40 has been shown in an "exploded" view, it will be understood that the head would actually have the core parts 41 and 42 butting at the interface 42*a* and would have the poles 46 and 47 in close engagement with the opposite sides of the non-magnetic gap spacer 48, with the magnetic record medium traveling successively across the poles of 46 and 47 essentially in the same configuration as illustrated in FIGS. 1 and 2. Further, a transducer winding (not shown) could link the magnetic core of head 40 in the same way as illustrated in FIGS. 1 and 2, such winding having a number of turns to essentially fill the window defined by the interior core faces such as indicated at 50 and 51.

In accordance with the embodiment of FIG. 3, electrical current may be established along a path directly through the pole 46 of magnetic material of the core part 41. To this end, a recording current supply is indicated at 52 having a conductor 53 leading to one side face of the pole 46 and having a return conductor 54 leading from the opposite side of the pole 46 so as to define an electric current flow path through the pole 46 from one side of the core to the opposite side. The conductors 53 and 54 may connect with the pole 46 closely adjacent the gap spacer 48 and closely adjacent the tape path across the poles substantially as diagrammatically indicated in FIG. 3.

The embodiment of FIG. 3 may operate in accordance with any of the alternatives referred to with respect to FIGS. 1 and 2, so that the recording currents supply 52 may supply high frequency bias current, signal current, or signal current together with a superimposed high frequency bias current. Further, in either of the embodiments of FIGS. 1 and 2 and FIG. 3, high frequency erase current may be supplied to the magnetic material which forms part of the coupling region of the head, that is to the magnetic gap spacer 25 or to the region 46 in FIG. 3. The recording current supply 52 may utilize a transformer such as described with reference to FIG. 1, for example.

As in the embodiment of FIGS. 1 and 2, during playback, the non-magnetic gap spacer 48 would itself define the extent of the coupling region with the magnetic record medium so as to provide for high resolution playback of recorded video signals, for example. On the other hand, the coupling region with respect to the high frequency bias current or high frequency erase current would have a substantially greater extent than the extent of the spacer 48 and would, for example, be substantially equal to the thickness of the magnetizable layer such as indicated at 32 in FIG. 2.

As a further alternative, additional conductors as indicated at 53a and 54a could extend from the conductors 53 and 54 to opposite sides of the region 47 of the core part 42 so that the regions 46 and 47 would both receive exciting current from the recording current supply 52. This would further increase the effective longitudinal extent of the coupling region for recording or erase operation of the head 40.

FIG. 4 illustrates a magnetic head 60 comprising a magnetic core 61 having poles 62 and 63 across which a magnetic tape record medium 64 travels as indicated by the arrow 65. The core 61 may be provided with a transducer winding 66 and may in general have the same configuration as described with any of the other embodiments hereof.

In the embodiment of FIG. 4, a gap spacer 68 of magnetic material is provided between the poles 62 and 63 and defining the sole coupling region of the magnetic core 61 for coupling of the core with the magnetizable layer of the record medium 64 during recording or erase operation, for example. Preferably the gap spacer 68 may have a thickness corresponding to the thickness of the magnetizable layer of the record medium 64. Thus the gap spacer 68 may be energized in any of the ways described with reference to the gap spacer 25 of FIGS. 1 and 2. The head of FIG. 4 will provide an essentially closed magnetic flux path substantially entirely within the magnetic material of the head 60 when the gap spacer 68 is in the deenergized condition. Thus, during playback of the record 64 with a playback head (not shown) the magnetic gap spacer 68 serves to essentially prevent any external magnetic field intersecting the magnetizable layer of the record medium 64 due to residual magnetization of the core 61, for example. A distributed winding as indicated at 66 may be used with these heads to keep the external field at a low value when the head is energized.

Preferably, the magnetic gap spacer 68 is electrically insulated from the poles 63 and 64 by electrical insulating layers such as indicated at 69 and 70 which may be formed in any of the ways previously described with reference to the insulating layer 33 of FIG. 2. On the other hand, if spacer 68 is not insulated and some of its current is diverted through pole portions 62–63 a more diffuse field is obtained which may be desirable for certain erasing or recording operations.

As a further alternative, the head 60 may be utilized for playback operation (exclusively, or in conjunction with recording and/or erasing) in which case the gap spacer 68 may have a reduced thickness so as to serve as a playback coupling region when rendered of low permeability or essentially non-magnetic in any of the ways described herein. When not rendered non-magnetic, the spacer completes the magnetic circuit to give a "gapless" head.

In each of the embodiments, the magnetic gap spacer such as 25 or 68 may be energized with direct current so as to produce a direct current biasing field in the path of the record medium or so as to provide a direct current erasing field or direct current cross field component, for example. Further in each of the embodiments, the permeability of the magnetic gap spacer may be dynamically controlled as by varying the saturation current through the spacer so as to effectively vary the longitudinal extent of the coupling region. For example when the coupling region has a small longitudinal extent, the conditions are best for recording high frequencies (or for high resolution playback), while when the extent of the coupling region is greater, the head would be especially effective for the recording of lower frequencies since the gap field corresponding to the larger extent of coupling region would provide adequate bias amplitude throughout the thickness of the magnetizable layer of the tape record medium, for example providing a bias amplitude in the magnetizable layer 32, FIG. 2 at the portion most remote from the head substantially equal to or exceeding the coercivity of the magnetizable layer.

In a modification of the head of FIG. 4 the magnetic gap spacer 68 has a thickness approximately equal to the thickness of the magnetizable layer of the record medium 64. The head 60 is used for playback operation by omitting the insulating layer 69 but retaining a very fine insulating layer 70 to serve essentially as an extremely small gap for playback operation.

In FIG. 5 there is illustrated a magnetic transducer head 80 comprising a magnetic core 81 having pole portions 82 and 83 and a transducer winding 84 generally similar to the preceding embodiments, a magnetic tape record medium traveling successively across the poles 82 and 83 as illustrated in FIG. 2 for example. In the embodiment of FIG. 5, a non-magnetic gap spacer 85 is provided similar to the gap spacer 24 of FIGS. 1 and 2, and a gap spacer 86 is provided which may provide magnetic properties, for example when the head 80 is deenergized. By way of example, the magnetic material of spacer 86 may be selected so that the application of heat thereto will bring the spacer into a substantially lower permeability or non-magnetic condition, for example by raising the temperature of the magnetic material above the magnetic transition or Curie point. A non-inductive heating element is indicated at 88 which is in good heat transfer relation to the magnetic material of spacer 86 so as to render the material of spacer 86 effectively substantially non-magnetic when electric current is supplied to the conductors 88*a* of the heating element, for example during recording or erase operation as described in reference to any of the other embodiments hereof. When the heating element 88 is deenergized and the material of spacer 86 is substantially at the ambient or room temperature, the head 80 will suitable for playback of recorded video signals as described with reference to other embodiments hereof.

Referring to FIG. 6, there is illustrated a magnetic head 90 comprising a magnetic core 91 having pole portions 92 and 93 and a transducer winding 94 as in any of the other embodiments hereof. A magnetic tape record medium may have its magnetizable layer move successively across poles 92 and 93 as illustrated in FIG. 2, for example. In this embodiment a magnetic gap spacer 95 is provided having a first leg 96 extending between the poles 92 and 93 adjacent the record medium path and having a second section 97 located more remotely from the record medium path, and providing for current flow along current flow paths such as represented by the arrows 98 and 99. The spacer 95 may be energized, for example, by connecting conductors such as indicated at 53 and 54 to the end portions 96a and 97a for example to supply any of the exciting currents referred to herein. By way of example, signal and/or bias currents may be supplied to the spacer 95 and to the winding 94 with polarity directions as indicated by arrows 98–100 so as to produce aiding signal field components at the trailing pole 93 in the path of the record medium thereacross. Superimposed bias frequency currents may also be supplied to spacer 95 and winding 94 with suitable phase relationships, for example so as to produce a resultant bias frequency field at the trailing pole having a sharper gradient than the resultant signal field. If desired, the current flow path provided by spacer 95 may be insulated from the remaining parts of the head in any of the ways described herein. A localized return path is thus provided by hairpin loop 95 for currents that control the magnetic permeability of the loop.

Figure 7:
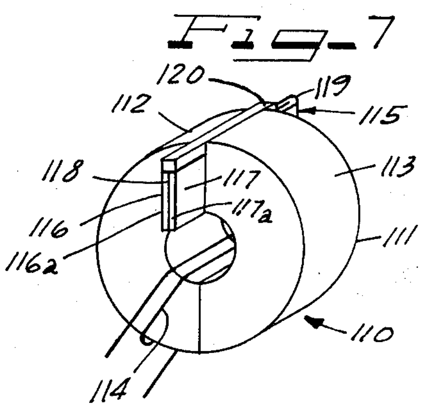
FIG. 7 shows a further embodiment with longitudinally offset current flow paths in the gap region.

FIG. 7 illustrates a magnetic transducer head 110 having a core 111 with poles 112 and 113 and a transducer winding 114. A magnetic gap spacer is indicated at 115 having a first length 116 extending adjacent the leading pole 112 and a second length portion 117 extending adjacent the trailing pole 113. The length portions 116 and 117 may be electrically insulated by means of an insulating layer 118 therebetween except at the connecting portion 119. The current flow path is then along the length of portions 116 and 117 in series with the ends 116a and 117a being connected with respective energizing conductors such as conductors 53 and 54 in FIG. 3 to provide any of the energizing current alternatives described herein. By supplying a saturating current to the current flow path of spacer 115, the magnetic material of the spacer may be substantially saturated to render the spacer effectively substantially non-magnetic during recording or erase operation of the head. Because of the side by side relationship of the conductor lengths 116 and 117, the currents through these conductors produce a localized effect at the gap without exciting the core portions 112, 113. These core portions are excited by the winding 114. A non-magnetic gap 120 separates 116 and 117 from the upper part of the space between the poles 112 and 113 so as to separate the record medium path from the "close" magnetic field produced by the gap spacer 115, but allows the spacer to be rendered magnetic or non-magnetic by current sent through it. If the spacer 115 is directly adjacent the record medium path, energization of the gap spacer will produce a magnetic field which is generally vertical with respect to the orientation as viewed in FIG. 7, that is generally normal to the tape path at the coupling region of the head 110.

Figure 8:
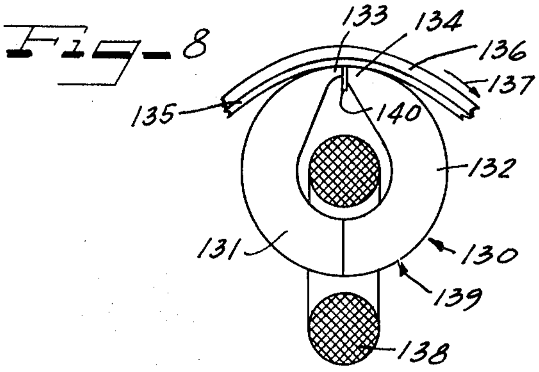
FIG. 8 illustrates a further embodiment of magnetic transducer head with a predetermined pole configuration.

FIG. 8 illustrates a magnetic head 130 comprising magnetic core parts 131 and 132 having respective pole portions 133 and 134 across which a magnetizable layer 135 of a magnetic tape record medium travels as indicated by arrow 137. A transducer winding is indicated at 138 linked to the core 139 of head 130. A non-magnetic gap spacer is indicated at 140 between the confronting poles 133 and 134.

In the embodiment of FIG. 8, core part 131 is formed of a relatively easily saturable magnetic material in comparison to the magnetic material of the core part 132. For example, core part 131 may be made of a high permeability ferrite which saturates readily, or of Mumetal (composition 5 percent copper, 2 percent chromium, 77 percent nickel and the remainder iron and minor constituents) which saturates at a lower field than other high permeability core materials or the like. An electric saturating current may be established through the pole portion 133 in the same manner as illustrated in FIG. 3, for example, or saturation may be induced by high flux densities in constricted portion 133 when excited by coil 138. The operation of the embodiment of FIG. 8 may correspond to that of any of the other embodiments herein. The core half 132 may be made of a magnetic material that saturates with relative difficulty such as 4750 alloy (composition 48 percent nickel and the remainder iron and minor constituents), silicon steel, or the like. During recording or erase operation, the flux through pole portion 133 serves to saturate this portion of the magnetic core to provide a coupling region including the magnetic material 133 and the non-magnetic material 140 with respect to recording or erase operation as in the embodiment of FIG. 3, for example. The longitudinal extent of the magnetic material 133 may substantially correspond to the thickness of the magnetizable layer 135 so that the longitudinal extent of the coupling region will be substantially equal to the thickness of the magnetizable layer 135 as described with reference to other embodiments herein.

As an alternative, the material of core part 131 may be of a magnetic material having a relatively low Curie temperature in comparison to the magnetic material of the core part 132, for example part 131 may be made of certain ferrites or nickel iron alloys of low Curie point, the gap spacer 140 being an electrical conductor which becomes heated by eddy current losses and transmits the heat to the magnetic material 133 raising its temperature above the Curie temperature during recording or erase operation. For example, a high frequency bias current may be supplied to the gap spacer 140 in any of the ways shown in the other embodiments hereof so as to heat the magnetic material 133 by eddy current losses. Again, the coupling region for recording or erase would include both the regions 133 and 140 during the time that the portion 133 was heated above its Curie temperature.

In either event, the trailing pole 134 will provide a sharply defined trailing edge for the coupling region of the head 130. During playback operation, the portion 133 will exhibit high permeability and the effective gap size will conform with the thickness of the non-magnetic gap spacer 140 which may be of a suitable size for scanning of longitudinally recorded video signals, for example. Thus the thickness of the gap spacer 140, as with the gap spacer 24 of FIGS. 1 and 2, the gap spacer 48 of FIG. 3 and the gap spacer 85 of FIG. 5 may have a thickness which is substantially less than the thickness of the magnetizable layer 135, being a minor fraction thereof, such as for example 20 microinches ($20 \times 10^{-6}$ inch) compared to 200 microinches for layer 135, while the coupling region including the magnetic material 133 and spacer 140 would have an overall extent in the direction of record medium travel of about 200 microinches.

Figure 9:
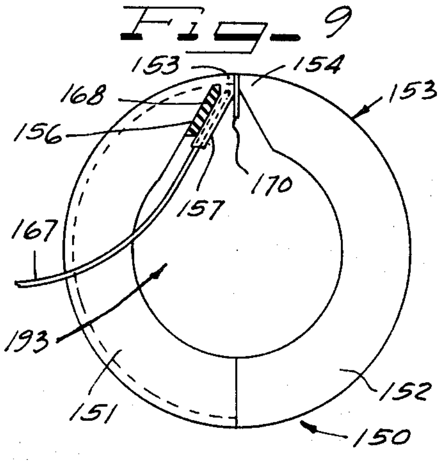
FIG. 9 shows another embodiment particularly designed as an improvement to the embodiment of FIG. 2.
Figure 10:
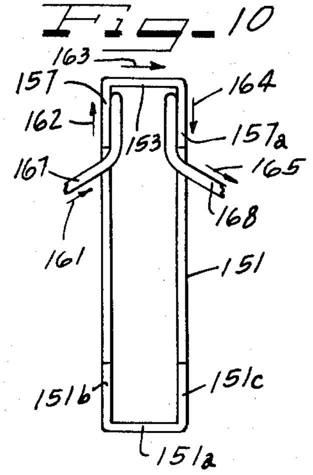
FIG. 10 is a vertical sectional view of the head of FIG. 9 showing the energizing electric circuits therefor.

FIGS. 9 and 10 illustrate a further magnetic transducer head 150 comprising core parts 151 and 152 having respective pole portions 153 and 154 across which a record medium successively travels. Core 153 may be provided with a transducer winding as in the preceding embodiments. Each of the core parts 151 and 152 may have a channel cross section configuration as illustrated in FIG. 10 including a main core portion 151a side core portions 151*b* and 151*c*.

In order to avoid a gap between the coupling region and the leading magnetic pole in the embodiment of FIG. 9, a slot is provided as indicated at 156 in FIG. 9 so as to define a section of magnetic material at 157, FIG. 9, and at 157 and 157*a*, FIG. 10. The magnetic material at 157 and 157*a* serves to define an electric current flow path as indicated by arrows 161–165 through the magnetic material of regions 157, 153 and 157*a*, FIG. 10, so as to constitute these regions as part of the coupling region of the head during recording or erase operation. The slot 156 and the corresponding slot defining magnetic material 157*a* may be filled with a suitable plastic material 168 such as an epoxy resin. A non-magnetic gap spacer 170 between the confronting poles 153 and 154 serves to define the coupling region during playback operation. The operation of the embodiment of FIGS. 9 and 10 may conform with any of the other embodiments described herein, exciting current being supplied by means of electrical conductors 167 and 168 as indicated in FIG. 10, by means of an electric circuit such as indicated in FIG. 3 for example.

Figure 11:
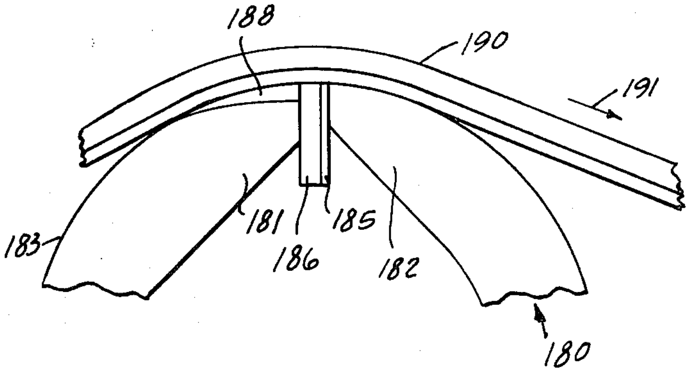
FIG. 11 illustrates a further embodiment of magnetic transducer head in accordance with the present invention.

FIG. 11 illustrates a magnetic transducer head 180 including pole portions 181 and 182 of a magnetic core 183 which may be of ring configuration as the other embodiments herein. In this embodiment, a non-magnetic gap spacer 185 and a gap spacer 186 of magnetic material are provided with may correspond to any of the other embodiments herein. In this embodiment, a non-magnetic separator layer 188 is provided on the pole 181 which pole is then offset from the record medium path of the magnetic tape record medium 190 which travels in the direction of arrow 191. The layer 188 may be formed by chrome plating or by depositing a layer of silicon monoxide, for example. This arrangement gives a relatively sharply defined magnetic field at the trailing edge defined by pole 182 while giving a relatively diffuse field at the leading side of the coupling region as provided by magnetic pole 181.

In any of the embodiments herein utilizing a non-magnetic gap spacer, the electric exciting current of any of the embodiments may be supplied to the electrically conductive non-magnetic gap spacer such as 185 in FIG. 11 as well as to the gap spacer such as 186 of magnetic material. Also, in any of the embodiments, the electrically conductive non-magnetic gap spacer such as 185 may be insulated from the magnetic gap spacer such as 186 and receive a separate exciting current for the purpose of defining a main magnetic field for cooperation with a cross magnetic field component produced by the energization of the gap spacer such as 186 of magnetic material.

In each of the embodiments, the magnetic material forming a part or all of the coupling region may be of saturable magnetic material which receives sufficient exciting current or magnetic flux to place the same in saturated condition, for example during recording or erasing operation. In each of the embodiments, the magnetic material of the coupling region may be heated or cooled so as to bring the material above or below the magnetic transition or Curie point of the spacer material, or a magnetic field may be applied thereto as in producing a quenching action in a super conductor. In any of the embodiments, a pole portion such as the leading and/or trailing pole portion of the head may be caused to exhibit substantially reduced permeability or substantially non-magnetic properties by passing an electric current from one edge of the core to the other through such magnetic material, preferably near the non-magnetic gap spacer if any and with the exciting current circuit preferably returning outside of the core window (such as the core window indicated at 193 in FIG. 9.) Each of the embodiments may have a main signal or bias field supplied by energizing an electrically conductive non-magnetic gap spacer, by means of a main transducer winding linking the core, or by means of a core at the opposite side of the record medium path, for example. The magnetic material of the coupling region may be energized in any of the embodiments with high frequency bias current which may be as high as 100 megahertz or higher, with a signal current and superimposed high frequency bias having such frequency, or with signal current only, for example. Any of the embodiments may be operated with both main and cross field components of high frequency bias having a frequency as high as 100 megahertz or higher and/or signal frequencies. Any of the embodiments may operate as combined erasing and/or recording and/or playback heads with a coupling region of greater extent during erasing or recording operation to provide for more efficient penetration of the magnetic recording or erasing field through the thickness of the tape layer. For example, in each of the embodiments, the coupling region during erasing or recording may have an effective extent substantially equal to the thickness of the magnetizable layer of the record medium. In any of the embodiments, the effective size of the coupling region may be adjusted by means of an electric current through the magnetic material, an applied magnetic field to the magnetic material, temperature change of the magnetic material of the coupling region, or in general supplying energy or withdrawing energy from the magnetic material of the coupling region.

In each of the embodiments, the head may be operated to provide a relatively sharp trailing edge of the coupling region while the leading side of the coupling region may have a relatively diffuse magnetic field. Each of the embodiments may have a coupling region formed exclusively of magnetic material, or formed partly of magnetic and partly of non-magnetic material.

In each of the embodiments, electric current may be supplied to the magnetic material of the coupling region by means of an oscillator tank coil directly adjacent the head so as to provide substantially a minimum length of current flow path and a minimum resistance connection to the magnetic material of the coupling region.

In each of the embodiments, the trailing side of the coupling region may be formed of solid non-laminated magnetic material to give a skin effect that increases the gradient of the magnetic field adjacent a current energized gap spacer, which gap spacer may be of non-magnetic or magnetic material. In each of the embodiments, the magnetic material of the coupling region may be energized with a very high frequency electric current having a frequency from ten to 100 megahertz or higher. Such very high frequency energization of the magnetic material of the coupling region tends to provide a crowding effect of current toward the record medium path with a locally completed short magnetic return path not requiring completion through the inefficient main core which may be of relatively thick magnetic metal and have relatively high eddy current and hysteresis losses at the high bias frequencies.

In each of the embodiments the magnetic material of the coupling region can be energized with direct current, such as to produce a direct current magnetic biasing field or direct current erasing magnetic field or a direct current magnetic cross field component, for example.

In each of the embodiments the condition of the magnetic material of the coupling region may be dynamically varied as to permeability so as to dynamically vary the effective size of the coupling region, for example to provide optimum recording of high and low frequency components, or optimum high frequency bias penetration of a magnetizable layer, modulation effects, or the like.

Any of the embodiments illustrated or referred to herein may utilize any of the features of the other embodiments.

In FIG. 1 the transformer would ordinarily be larger physically than the core parts 2.

In FIG. 1 the strap leads 27 should be closely spaced and of short length to minimize inductance and losses. These leads may form a transmission line at high frequencies. Similarly for leads 53 and 54 in FIG. 3.

In FIG. 3 the high frequency current through the region 46 and the associated magnetic flux concentrates at the top surface of the head because current paths below the top surface link more of the magnetic path through the core, and are opposed by the increased inductance. The flux is therefore set up directly at the gap where it is most useful, and minimized in other parts of the core where it is wasted as losses and heat.

The cores of each of the embodiments shown or described herein may be mounted as illustrated in my copending application Ser. No. 628,682 filed Apr. 5, 1967, the disclosure of which is incorporated herein by reference with respect to each of the embodiments hereof. The disclosure of my copending application Ser. No. 536,869 filed Mar. 23, 1966 is also incorporated herein by reference in its entirety as showing further modifications of each of the embodiments hereof which are contemplated hereby.

I claim as my invention:

1. A magnetic head comprising a magnetic core having a coupling region for coupling of the core with a magnetic record medium during a recording operation, said coupling region including a leading section and a trailing section across which the record medium successively travels during the recording operation, the leading section of said coupling region being formed of a magnetic material, and electric circuit means connected in an electric circuit with said magnetic material of said leading section of said coupling region for supplying electric current through said magnetic material during recording operation and operable for substantially reducing the magnetic permeability of said magnetic material during said recording operation in comparison to the permeability thereof when the head is deenergized, said trailing section of said coupling region being formed by a non-magnetic material having a thickness which is substantially less than the thickness of said magnetic material of said leading section and which is effective for reproducing signals recorded on the record medium during the recording operation, said leading section of said coupling region directly adjoining said magnetic core at the leading side of said coupling region and having a magnetic permeability substantially corresponding to that of said magnetic core during playback operation to avoid any substantial signal flux pickup from the record medium during playback operation except at said trailing section of said coupling region, and the scanning dimension of the magnetic head for playback operation being determined by the thickness of said non-magnetic material.

* * * * *